(12) United States Patent
Juda et al.

(10) Patent No.: US 7,169,281 B2
(45) Date of Patent: Jan. 30, 2007

(54) ELECTROCHEMICAL PRESSURIZER/PURIFIER OF HYDROGEN FOR OPERATION AT MODERATELY ELEVATED TEMPERATURES (INCLUDING HIGH-TEMPERATURE ELECTROCHEMICAL PUMP IN A MEMBRANE GENERATOR OF HYDROGEN)

(75) Inventors: Walter Juda, Lexington, MA (US); R. Todd Bombard, Foxborough, MA (US); Charles W. Krueger, Cambridge, MA (US)

(73) Assignee: Hy9Corporation, Woburn, MA (US)

( * ) Notice: Subject to any disclaimer, the term of this patent is extended or adjusted under 35 U.S.C. 154(b) by 503 days.

(21) Appl. No.: 10/351,740

(22) Filed: Jan. 24, 2003

(65) Prior Publication Data

US 2003/0155252 A1 Aug. 21, 2003

Related U.S. Application Data

(60) Provisional application No. 60/358,620, filed on Feb. 1, 2002.

(51) Int. Cl.
*B01D 61/46* (2006.01)
*B01D 61/44* (2006.01)

(52) U.S. Cl. .................. 204/630; 204/520; 204/252

(58) Field of Classification Search ............. None
See application file for complete search history.

(56) References Cited

U.S. PATENT DOCUMENTS

| 2,980,749 | A | * | 4/1961 | Broers | 429/38 |
| 3,755,131 | A | * | 8/1973 | Shalit | 204/246 |
| 4,444,632 | A | * | 4/1984 | deNora | 205/513 |
| 2003/0155252 | A1 | * | 8/2003 | Juda et al. | 205/354 |

* cited by examiner

*Primary Examiner*—Harry D. Wilkins, III
(74) *Attorney, Agent, or Firm*—Rines and Rines

(57) ABSTRACT

An generator of pure pressurized high pressure hydrogen comprising a molten hydroxide or eutectic mixture electrolyte pressurizing chamber bounded by a hydrogen-selective anode and a hydrogen-selective otherwise gas impermeable cathode respectively connected to a D.C. power supply, with the pressurizing chamber maintained at a temperature between the melting point of the electrolyte and about 600° C., wherein, upon passing D.C. current between the anode and cathode, pure hydrogen arriving on the electrolyte bounding with the anode substantially instantaneously reacts with hydroxyl ions from the electrolyte to form water and electrons and evolves pressurized pure hydrogen gas on the cathode, and with such substantially instantaneous reaction at the anode creating a suction effect which effectively pumps pure hydrogen permeating through said anode.

23 Claims, 5 Drawing Sheets

ELECTROCHEMICAL PRESSURIZER/PURIFIER OF HYDROGEN FOR OPERATION AT MODERATELY ELEVATED TEMPERATURES (INCLUDING HIGH-TEMPERATURE ELECTROCHEMICAL PUMP IN A MEMBRANE GENERATOR OF HYDROGEN)

FIELD OF THE INVENTION

The present invention relates to generating hydrogen for a wide variety of chemical applications and as a fuel, by way of example, for proton exchange membrane (PEM) fuel cells; and more particularly, generating pure hydrogen at a moderately elevated temperature in an electrochemical pressurizer connected to a metallic hydrogen-selective membrane bounding a chamber containing hydrogen at a low pressure.

Part of this invention is the subject matter of Provisional Patent Application Serial No. 60/358620 entitled High-Temperature Electrochemical Pump in a Membrane Generator of Hydrogen, filed Feb. 1, 2002, which describes generating electrochemically hydrogen, at a moderately elevated temperature (therein called "High-Temperature") in an anodic chemical reactor chamber and simultaneously permeating pure hydrogen in situ from the reactor chamber through an electron conducting, hydrogen selective membrane bounding thereto, e.g., a palladium-bearing tube or foil, into an interconnected electrochemical pressurizing or pumping chamber wherein pure cathodic hydrogen is evolved and pressurized.

BACKGROUND OF THE INVENTION

Generating pure hydrogen at an elevated temperature by reacting a fossil fuel with steam and simultaneously permeating hydrogen through a hydrogen selective membrane is well known in the art, as reviewed for example, in U.S. Pat. No. 6,171,574 B1 (2001), of common assignee, incorporated herein by reference. Reference is further made to U.S. Pat. Nos. 5,326,550 (1994) and 6,3311,283 B1 (2001), which patents describe such membrane reactors in which natural gas is steam-reformed in the presence of a fluidized catalyst bed.

Of particular relevance to the present invention is the experimentally verified Sievert's and Fick's Laws of the prior art, according to which the hydrogen flux through the membrane is proportional to the difference of the square roots of the hydrogen pressures in the high-pressure and low-pressure chambers of a palladium-bearing membrane generator of pure hydrogen. To lower the pure hydrogen pressure, a sweep gas (e.g., nitrogen or steam) has been used in the art to enhance hydrogen flux. This technique therefore increases not only the hydrogen flux, but can also increase the yield of pure hydrogen from an impure hydrogen-containing gas mixture by lowering the hydrogen partial pressure required at the impure stream exit to maintain hydrogen flux through the membrane. However, these benefits are attained at the expense of having to separate the sweep gas from the hydrogen product and having to pressurize the pure hydrogen product. Using more sweep gas per unit of hydrogen permeated evidently provides greater benefits but at a greater expense for the subsequent separation/pressurization.

The capability of permeating hydrogen in situ from a fossil fuel reforming reactor through an anodic hydrogen selective palladium-alloy membrane in a molten alkaline hydroxide electrolyte fuel cell has been described, for example, in U.S. Pat. Nos. 3,407,049, 3,407,094 (1968) and 3,669,750 (1972). (This fuel cell was abandoned due to the costly removal of carbon dioxide from large quantities of cathodic air.)

The relevance of these patents to the pressurizer of the present invention is illustrated by the following plausible interpretation. Under D.C. power a permeated hydrogen atom reacts at the anodic interface with, for example, one hydroxyl ion of a molten alkali hydroxide, producing one water molecule and one electron. Due to this practically instantaneous reaction, the effective hydrogen gas pressure on the membrane's electrolyte-facing side is zero, and the hydrogen flux through the membrane is therefore maximized in accordance with Sievert's Law. In the fuel cell case, the liberated electron ionizes corresponding amounts of the air's oxygen and water at the cathode thus generating the D.C. power in the external circuit and replenishing the hydroxyl ion in the electrolyte, all at ambient pressure. To the contrary, the pump of this invention requires a D.C. power supply and a pressurized chamber and, advantageously no moving parts.

Moreover, the cathodic evolution of hydrogen is now subject to an overvoltage the magnitude of which depends not only on current density and temperature, but significantly on the nature of the cathode. This is shown, for example, in the article entitled "Ni—Mo—O alloy cathodes for hydrogen evolution on hot concentrated NaOH solution" by A. Kawashima, T. Sakaki, H. Habazaki, K. Hashimoto, *Material Science and Engineering* A267 (1999) 246–254 incorporated herein by reference. In particular, FIG. 8, page 251, illustrates the sharp lowering of the overvoltage by the Ni—Mo—O coating of nickel vs. uncoated nickel. By way of another example, a publication, also incorporated herein by reference, entitled "Electrode properties of amorphous nickel-iron-molybdenum alloy as a hydrogen electrocatalyst in alkaline solution", by W. Hu, Y. Zhang, D. Song, Z. Zhou, Y. Wang, *Materials Chemistry and Physics* 41 (1995) 141–145, details an electrolytic technique of coating, for example, a copper or nickel sheet with a Ni/Fe/Mo alloy resulting in effective and stable hydrogen-evolving cathodes in the electrolysis of 30 wt. % KOH at 70° C.

Electrochemical hydrogen compression is well known in the art for many years. Reference is made to recent development of compressors using PEMs as the electrolyte, as described for example in two publications, one entitled "Electrochemical hydrogen compressor" by B. Rohland, K. Eberle, R. Ströbel, J. Scholta and J. Garche, *Electrochimica Acta*, Vol. 43, No. 24, pp. 3841–3846 (1988) and the other entitled "The compression of hydrogen in an electrochemical cell based on a PE fuel cell design", by R. Strobel, M Oszcipok, M. Fasil, B. Rohland, L. Jorissen, and J. Garche, *J. of Power Sources*, Vol. 105, pp. 208–215 (2002).

The use of a phosphoric acid electrolyte in an electrochemical hydrogen purifier of impure hydrogen, including compression thereof, is described in U.S. Pat. No. 4,620,914 (1986). Here porous gas diffusion electrodes were employed. Further the generation of electrolytic hydrogen utilizing palladium or palladium alloy electrodes is described in U.S. Pat. No. 4,078,985 (1974) in which the electrolyte is an aqueous solution containing 20% of NaOH (Col. 3, 1 3–4).

Electrochemical hydrogen pumping using ceramic proton conductors at 900° C. has recently been described in publications by H. Matsumoto, F. Asakura, K. Takeuchi and H. Iwahara, *Solid State Ionics*, [129 (2000) pp 209–218]; by H. Matsumoto, Y. Iida and H. Iwahara [ibid. 127 (2000) pp 345–349)]; and by H. Iwahara [ibid. 125 (2000) pp 271–278]. Here hydrogen is electrochemically pressurized by applying a D.C. potential across a $SrCeO_3$-based, proton conducting electrolyte/membrane. In this scheme, hydrogen molecules are dissociatively ionized into two (2) protons and two (2) electrons on one face of the electrolyte/membrane and the hydrogen molecule is reassociated with the two electrons on the other face of the electrolyte/membrane, the higher pressure being achieved by increasing the applied voltage. This electrolyte/membrane is practically limited to excessively high temperatures due to the very low protonic conductivity of the membrane.

OBJECTS OF THE INVENTION

It is the broad object of this invention to provide an improved electrochemical pure hydrogen generator system and method comprising a D.C. power supply, an anode, a cathode, and a hydroxide electrolyte, which system operates at the moderately elevated temperature range between the melting points of the molten hydroxide and/or eutectic mixtures and about 600° C. This upper operating limit is fixed by the use of the preferred palladium-copper alloy anode. This temperature range takes advantage of uniquely combining the drastically higher ionic conductivities of the hydroxide electrolyte (over the conductivities of the electrolytes of the prior art above-described) with at least an anodic hydrogen selective membrane. This combination with a gas porous cathode produces water-wet, otherwise pure, hydrogen in conjunction with a steam supply. Alternatively, a hydrogen selective cathode is utilized which produces dry pure hydrogen in a generator comprising an electrolyte now bounded by the hydrogen selective, otherwise gas impermeable, cathodic membrane.

It is a further object of this invention to provide in such a new generator, a cathodic high pressure chamber producing therein pure hydrogen pressures in excess of 1000 psig and with a cathode with means for reducing the hydrogen overvoltage thereon.

Another object is to provide a novel no-moving parts pumping chamber with steam at its hydrogen pressure generating therein wet and otherwise pure hydrogen at moderate pressures at low parasitic power for use in PEM fuel cells and other applications.

Still another object of this invention is to provide an improved anode chamber with a fossil fuel reformate, externally or internally generated, for operation at moderately elevated temperatures.

It is further an object of this invention to provide a stack of at least two of such novel generators assembled electrically in series.

These and other objects are hereinafter more fully described in the specification and delineated in the appended claims.

SUMMARY

In summary, the invention relates broadly to producing pure pressurized high pressure hydrogen at moderately elevated temperatures preferably between the melting point of the alkali hydroxide electrolyte and about 600° C. (herein "moderately elevated temperature"), in an electrochemical generator system comprising a D.C. power supply, an anodic low-pressure impure hydrogen-containing chamber connected to a pressurizing (herein also called "pumping") chamber with no moving parts, by a preferably palladium-bearing hydrogen-selective metal membrane bounding the anode chamber. The pressurizing chamber comprises an immobilized, moderately water-wet molten inorganic hydroxide electrolyte contacting a cathode. (For the purposes of the invention, it is important that water (in a small amount) is dissolved in the molten alkali, rather than the other way around, which causes deleterious reaction at the electrodes). This electrolyte comprises preferably predominant amounts of the highly conducting alkali hydroxides which, when immobilized, protect the anode chamber from back permeation of the pressurized hydrogen due to the negligible solubility of hydrogen in molten alkali hydroxides. [See, for example, a publication entitled "Investigation of Hydrogen Solubility in Molten Alkali Metal Hydroxides" by E. A. Sullivan, S. Johnson and M. D. Banes, *Journal of the American Chemical Society*, Vol. LXXVII, pages 2023–2024 (1955), wherein it is stated that "the hydrogen solubility was found to be so small that it was within the experimental error of the measurements involved." (p. 2023, second paragraph).] Depending on the usually small vapor pressure of the water in the electrolyte, upon application of the D.C. power, moist but otherwise pure pressurized cathodic hydrogen is generated. It can be dried, if necessary, by conventional means such as a desiccant.

When wet, but otherwise pure, hydrogen is the desired product, as is the case, by way of an important example, of the PEM fuel cell anode feed, the pumping chamber is readily connected to a steam reservoir to provide the required humidity. Here the impure hydrogen in the low-pressure anode chamber is advantageously an internally or externally generated steam-reformate of a fossil fuel, in which reformate the partial pressure of the hydrogen is often well below atmospheric pressure. The applied D.C. power is then readily adjusted to generate the cathodic hydrogen at or near the minimum pressure required for the PEM fuel cell to minimize the parasitic power. For the same reason it is also important in this application to provide a cathode bearing an overvoltage lowering coating such as described, for example, in the above cited publication by A. Kawashima et al.

When pure, dry pressurized hydrogen is desired, as is the case, by way of important examples, at moderate pressure for the microelectronics industry and at much higher pressures for on-site generation in filling stations for fueling PEM fuel cell cars, for example, a sealed generator with an invariant electrolyte is provided, which generator comprises a cathodic high pressure chamber bounded by a second hydrogen-selective metal membrane in contact with the immobilized sealed-in electrolyte.

The pressurizer/purifier is especially advantageous when used in the generation of carbon oxides-free hydrogen by feeding low pressure steam reformates generated by well known processes to the anode chamber and imposing controlled D.C. power to generate the desired pressure of the pure hydrogen product. Further impure hydrogen can be generated in the anode chamber, for example by providing it with catalytic means for the reaction of a gaseous or gasified fuel with steam and/or air therein, whereby, under D.C., gaseous fuels include hydrocarbons, and in particular methane and propane, and gasified fuels include organic compounds such as alcohols, carbon monoxide by itself and "syn gas" (i.e. carbon monoxide admixed with hydrogen). Reaction temperatures are in the above-defined moderately elevated range of this invention. Reaction pressures can be low as is especially desirable for hydrocarbon-steam reactions where equilibrium hydrocarbon, conversions are enhanced.

In short, surprisingly, our invention combines a hydrogen generating reaction with an electrochemical hydrogen pressurizer (the no-moving parts pump) with means (herein preferably "immobilized molten hydroxide electrolyte") of preventing the pressurized cathodic hydrogen to permeate back to the anode chamber, where a lower hydrogen partial pressure exists. In the case of reforming in the anode chamber the system achieves simultaneously substantial conversion of the reactants to hydrogen by shifting chemical equilibrium and provides in situ heating of the chemical reaction, and produces a hydrogen product at a pressure higher than the partial pressure of hydrogen in the chemical reaction gas mixture.

Best mode and preferred embodiment designs are hereinafter more fully described.

DRAWINGS

FIGS. 1–4, as explained in our said provisional application No. 60/35862, depict the schematic cross sections of the above reactor, and they also more generically depict the generalized aspect of pressurizing hydrogen, in accordance with this invention, whether or not it has been generated within the assembly. Hence the term "upstream reaction chamber" for such generation may be more generically described hereinafter also as "low pressure hydrogen-containing chamber". The required D.C. power supply is not shown in the drawings, though is schematically represented at +,– in FIG. 1.

More specifically, FIG. 1 depicts a schematic cross section of the novel assembly of low-pressure hydrogen and electrochemical pumping chambers with the interconnecting anodic metallic hydrogen-selective membrane in accordance with the preferred embodiment of the invention.

Figure 6:
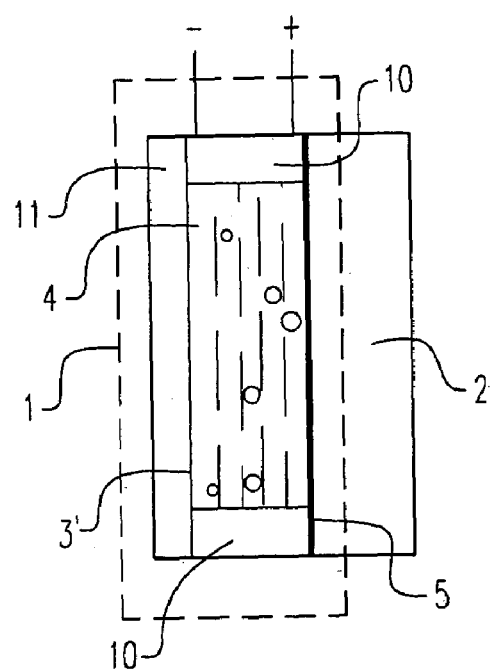
Figure 7:
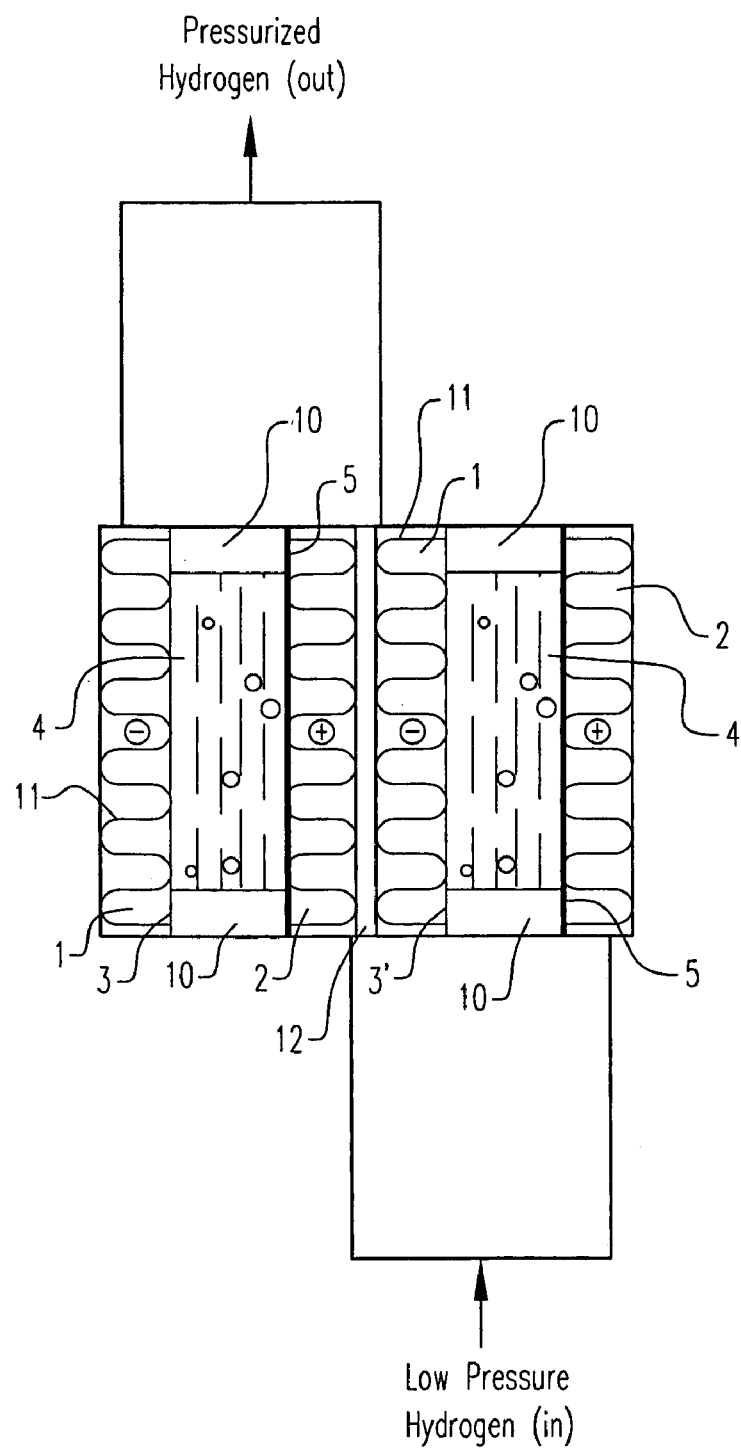

Additional FIG. 6 depicts a scaled pump assembly comprising a second cathodic metallic hydrogen-selective membrane, and FIG. 7 depicts an anodic low hydrogen pressure chamber connected to a pump by a pressure-resistant metallic bipolar plate as a component of a stack of at least two pressurizers assembled electrically in series.

DESCRIPTION OF THE INVENTION

In the following, several preferred embodiments of the pressurizer of this invention are described as illustrated in the Figures.

Figure 1:
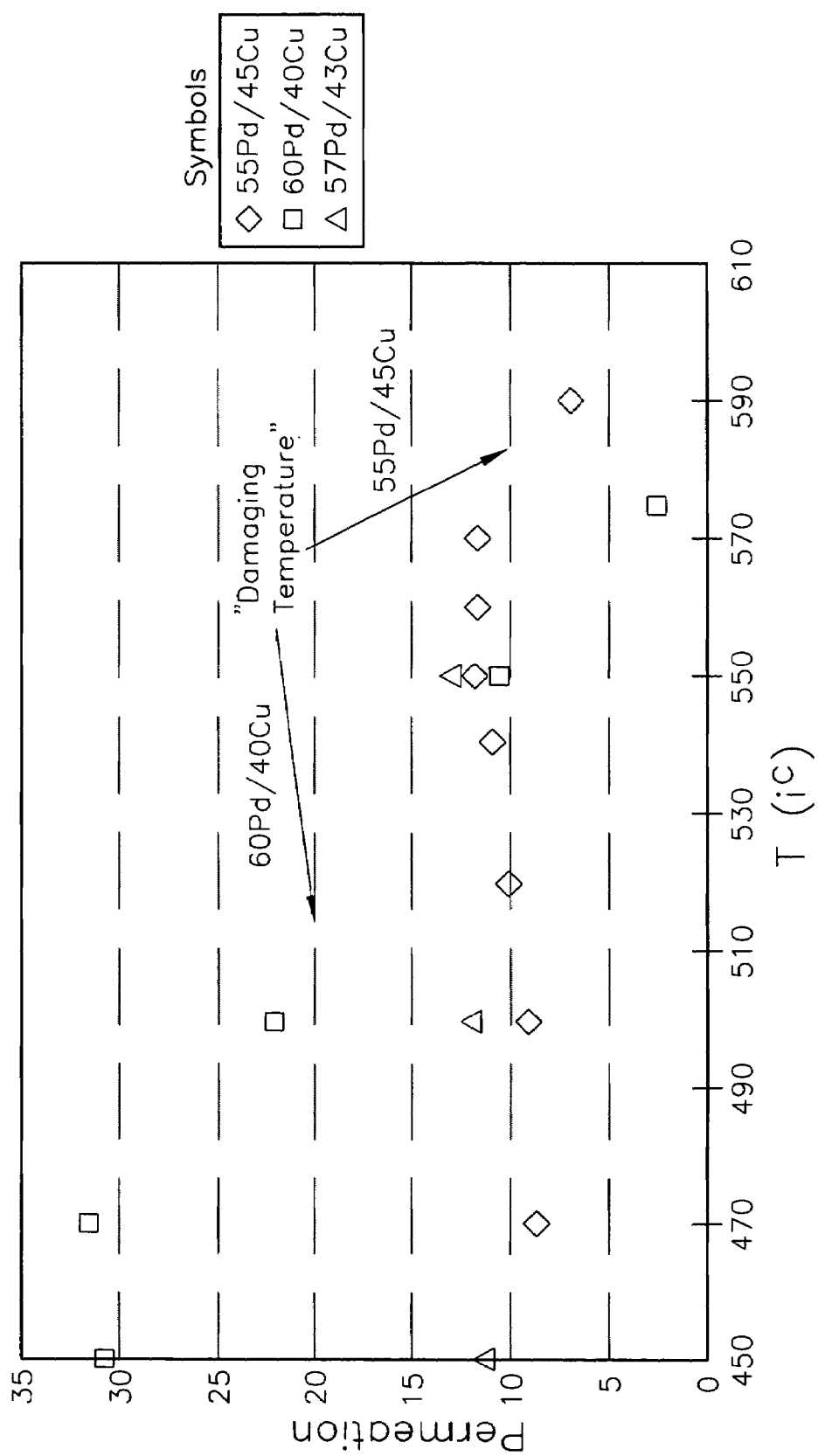

Referring first to FIG. 1, the assembly of this invention comprises the "downstream" electrochemical pump 1 in the dotted rectangle connected to the "upstream" low pressure hydrogen-containing chamber 2. The pump has its hydrogen-evolving cathode 3 in contact with molten alkali and/or alkaline earth hydroxide electrolyte 4 which, in turn, is in contact with the anodic hydrogen-selective membrane 5, bounding chamber 2. Upon passing a D.C. current (+,–) across the pump 1, pure hydrogen arriving on the electrolyte side of the membrane 5 is practically instantaneously reacted with hydroxyl ions forming water and electrons and is evolved as pressurized pure hydrogen gas on the cathode 3 (by the reverse anodic process). The instantaneous anode reaction creates a suction effect which causes pure hydrogen to permeate through membrane 5 from chamber 2 into the pump 1.

Suitable cathode 3 materials are those electronically conducting materials, for example, a metallic screen or felt or a sintered metal, such as nickel, which is resistant to attack by the (oxygen-free) molten hydroxide electrolytes at said before-defined moderately elevated temperatures.

For improved voltage efficiency, the cathode 3 is provided with suitable overvoltage-reducing coatings including, by way of examples, one comprising high surface area Raney nickel or coatings described in the above referenced publication by Kawashima et al and in references cited therein.

Suitable molten hydroxide electrolytes are more fully described below.

The metallic selectively hydrogen permeable membrane 5 must, of course, also be resistant to attack by the hydroxides and must not be subject to rupture by hydrogen embrittlement. Palladium bearing membranes, and particularly palladium alloys are suitable materials, including preferentially, membranes consisting of or comprising copper palladium and silver palladium alloys.

Finally, the walls of the assembly need to be similarly corrosion-resistant as well. Nickel and nickel alloys are examples of suitable wall materials.

Figure 2:
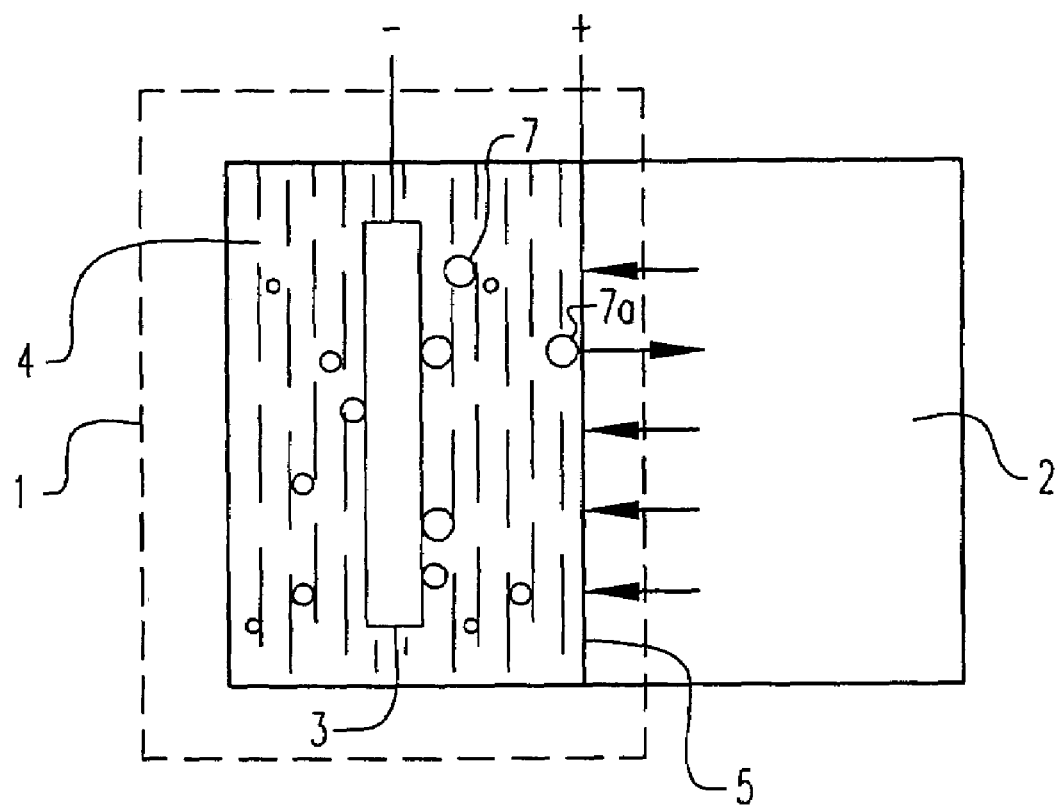
FIG. 2 illustrates vertical operation of the novel electrochemical pump therein.

Next, FIG. 2 illustrates schematically an exaggerated view of the evolution of hydrogen gas bubbles 7 at the pump cathode 3, which is spaced away from the anode 5. If the molten electrolyte is movable, as, for example, by only partially filling the pump 1, some cathodically evolved bubbles 7a can strike membrane 5 at high enough pressure leading to detrimental back diffusion of hydrogen into the low pressure chamber 2. This detriment is eliminated in accordance with the invention (referred to herein as "pressure protection"), in FIG. 2, by increasing the electrode spacing (at the expense of an increased electrolyte resistance) or better by filling the pump with inherently noncompressible liquid electrolyte.

Figure 3:
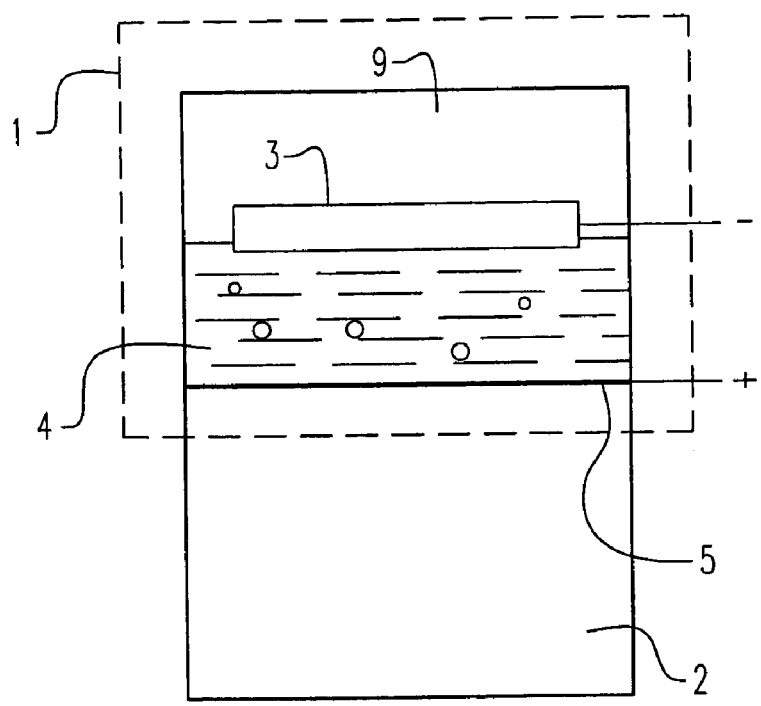
FIG. 3 illustrates horizontal operation of the electrochemical pump.

Pressure protection can also be accomplished in the horizontal configuration depicted schematically in FIG. 3, in which the anodic membrane 5, at the bottom of pump 1, is covered by a liquid layer of electrolyte 4, which in turn is in contact with the gas porous cathode 3. Under D.C. current, the cathodic hydrogen flows upward into the open space 9. The horizontal alignment allows gravity to maintain a hydrogen gas-impervious, continuous film of liquid on the anode so long as the layer thickness is made to exceed the diameter of the gas bubbles.

The only inefficiency here is dissolved hydrogen in the liquid layer, which is minimal, as herein above shown in the publication by E. A. Sullivan et al.

Figure 4:
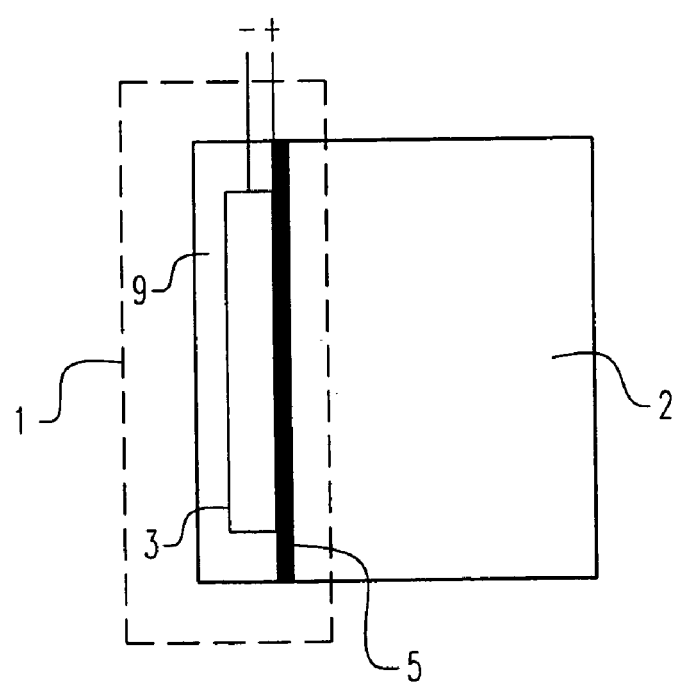
FIG. 4 depicts the improved pump design incorporating an immobilized electrolyte layer for pressure protection.

As schematically depicted in FIG. 4, pressure protection is also achieved by immobilizing the electrolyte in a porous, solid, alkali-resistant matrix. For example, we produce such a solid protector by soaking one or more molten alkali or alkaline earth hydroxide(s) into a porous zirconia felt or admixing such hydroxide(s) with magnesia forming a paste. Suitable low eutectics include the water-wet equimolar sodium-potassium hydroxide (m.p. 170° C.) and the 60:40 mol % barium-strontium hydroxide (m.p. 360° C.). The tortuosity of the liquid channels through the porous matrix provides substantial resistance to dissolved hydrogen diffusion back to the anode, and hence the pump efficiency is optimized.

Such an immobilized electrolyte is advantageous as well in that electrolyte loss through entrainment in the cathodic hydrogen is minimized, When highly pressurized hydrogen is generated, it is especially advantageous to immobilize molten hydroxide(s) forming solidified anode protection.

For example, we produce such solidification by soaking one or more molten alkali or alkaline earth hydroxide(s) into a porous zirconia felt or admixing such hydroxide(s) with magnesia forming a paste, as before described. This enables us to pressurize the cathodic hydrogen up to the bubble point of the "so-solidified" electrolyte layer without hydrogen back permeating into the low pressure chamber.

Figure 5:
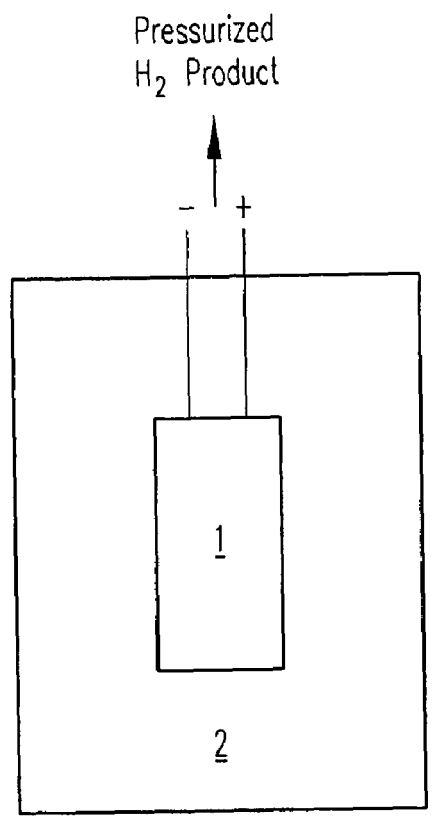
FIG. 5 depicts such an electrochemical hydrogen pump suspended within a fluidized bed catalytic reactor.

The following FIG. 5 depicts schematically the pump 1 suspended in a fluidized bed reactor chamber 2, wherein, for example, a gaseous or gasified fossil fuel is reacted with steam and/or air on appropriate fluidized particles producing hydrogen admixed with carbon oxides at ambient pressure and at an elevated temperature. Under a D.C. current applied to pump 1, pure hydrogen is permeated into the pump and cathodically pressurized therein.

FIG. 6 depicts schematically the important case of a sealed three-chamber unit in which the pump chamber 1 is provided with a metallic hydrogen-selective membrane 3'. In this configuration the electrolyte 4 fills the volume of an "electrolyte chamber" between the anodic membrane 3 and the cathodic membrane 3'. Here the electrolyte is invariant and kept in place by non-electronic conducting seals 10. Under an applied D.C. current low pressure hydrogen in chamber 2 is sucked into the electrolyte chamber by anodic water formation, as herein above explained; and hydrogen re-forms from water by the reverse reaction on the cathodic membrane 3' and permeates therethrough, without moisture entrainment, into the pump's chamber 11, generating pressurized dry pure hydrogen.

Finally, FIG. 7 depicts one of two anodic chambers 2 connected to one of two pumps 1, (as shown in FIG. 6), by a pressure-resistant metallic bipolar plate 12, this assembly being a component of a stack comprising at least two such pressurizers connected electrically in series. In such a stack, the D.C. power supply is conveniently connected to the end plates of the stack (not shown) which connection requires continuous electrical conduction across the stack. Thus the sinusoidal lines 11 in FIG. 7 depict the needed electronic conduction in the chambers 2 and 1, which is provided, for example, by metallic screens preferably fastened to the membranes and walls of these chambers to avoid contact resistances.

Under D.C. current, low pressure hydrogen 12 is supplied to or generated in chambers 2 and pressurized pure hydrogen 13 is removed from the chambers 1, care being taken to substantially equalize the high pressures in the set of chambers 1 and the low pressures in the set of chambers 2.

The following examples of modifications and of operating methods of the pressurizer are directed to two major applications, one of which aims at on site generation of highly pressurized hydrogen PRODUCT (e.g. ten to one hundred atmospheres) not only for a large variety of chemical uses, but also for hydrogen-filling stations for vehicular fuel cells; and the other of which aims at hydrogen as anode FUEL of stationary and vehicular PEM fuel cells (e.g. at less than one atmosphere). In the on site generation of the "highly pressurized" product the emphasis is on providing a significant advantage in capital cost and safety over liquid hydrogen or tanks of highly compressed hydrogen presently shipped and stored at the site of customers using, for example, up to a few thousand cubic feet per hour. Here, the electric energy consumption needed for pressurization is, within reason, not a limiting factor. To the contrary, as the "much lower pressure" anodic PEM fuel cell fuel, the required "parasitic" electric energy, which is inherently modest, needs to be kept to a minimum, namely well below 20% of the fuel cell's output per kilo watt hour, at acceptable capital costs.

Both uses have the advantages of silent operation with no moving mechanical parts and of the molten alkali hydroxides' specific conductivities which exceed that of the proton exchange membranes (PEMs) of the ambient-temperature compressors of the prior art by more than an order of magnitude Further the operation of the pressurizer at the moderately high temperature range of between about 275° C. and 600° C. enables uniquely purifying or generating therein fossil fuel-based impure hydrogen.

EXAMPLE 1

An electrochemical cell was constructed using two standard ½ inch stainless steel blind pipe flanges. Stainless steel tubing was fitted to holes drilled through the flanges to provide gas inlet and outlet ports to each flange. The tubes were welded to the flange to provide leak-tight seals.

Leak-tight current collector/electrode assemblies were fabricated by diffusion bonding (see U.S. Pat. No. 5,904, 754) a 0.001 inch thick×1.375 inch diameter Pd60/Cu40 weight percent foil disc to one side of a copper washer (1.375 inch outside diameter×1.125 inch inside diameter× 0.010 inch thick). The opposing side of the copper washer was diffusion bonded to a copper foil current collector containing two holes positioned to match the gas inlet and outlet ports in the flanges. A 100×100 mesh stainless steel wire cloth disc was included on the inside of the copper washer to provide a flowfield for gases and support the membrane electrode. The copper current collector included a tab for electrical connections which extended outside of the pipe flanges in the finished cell assembly. Identical foil electrode/copper current collector assemblies were used for the anode and cathode.

An electrolyte consisting of 38% sodium hydroxide, 56% potassium hydroxide, and 6% water (by weight) was heated to about 200° C. A 0.875 inch diameter zirconia felt (Zircar type ZYF-50) matrix disc was saturated with the electrolyte and allowed to cool.

The electrochemical cell was assembled by stacking a first expanded PTFE gasket (Gore type GR, 0.0625 inch thick sheet) on one flange followed by a first current collector/ electrode assembly, the electrolyte/matrix disc and second gasket, the second current collector/electrode assembly, a third gasket, and completed with the second flange. The current collector/electrode assemblies were positioned with the foil electrodes facing the electrolyte/matrix. The first and third gaskets were cut slightly oversized in the same shape as the current collectors to provide electrical insulation between the current collectors and pipe flanges. Holes in the first and third gasket were positioned to match the gas inlet and outlet ports in the flanges and current collectors. The second gasket was a full face flange gasket with a 0.875 inch diameter hole in the center to accommodate the electrolyte/ matrix disc.

Standard hex bolts, flat washers, Belleville washers, and nuts were used to compress the cell assembly and provide gas-tight seals. D.C. electrical connections for current an voltage were made with the current collector tabs using high-temperature wire and connectors. An A.C. electrical heating tape, temperature controller, and thermocouple were used to heat and maintain the cell at 300° C.

Hydrogen feed pressure to the anode was maintained at near atmospheric pressure using a low pressure regulator and measured with a pressure gauge. The anode gas outlet was open to the atmosphere. Cathode gas pressure was measured using pressure gauges. Needle or plug valves were used to restrict or stop outlet gas flow allowing pressure to build up within the cathode compartment.

The electrochemical cell assembly was positioned with the electrodes vertical and heated to 300° C. with a hydrogen purge flow through both the anode and cathode gas compartments. Both compartments were leak tested by individually pressurizing to about 3 psig, closing inlet and outlet valves, and verifying no pressure loss. D.C. power was then applied using a constant current D.C. power supply. After stopping purge flow to the cathode compartment the generated cathodic hydrogen flow was measured at several power inputs (e.g. 0.5 and 2 amps) using a soap bubble meter and stopwatch. Measured cathodic hydrogen flows were within experimental error of the expected flows according to Faraday's Law.

Hydrogen compression was verified by restricting or closing the cathode outlet flow while maintaining power input (e.g., $0.5$ $A/cm^2$). A maximum cathodic pressure of about 1300 psig from atmospheric pressure anode feed was achieved before a gasket leak developed.

In the operation of the pressurizer of this example a gradual voltage increase of about 0.2 volts has occurred over a period of three days e.g. at a setting of a constant applied current of 2 amps (ca. 0.5 amps/cm2). We attribute this increase in large part to some of the cathodic hydrogen remaining on the electrolyte face of the hydrogen-selective membrane (rather than permeating therethrough into the pressurized cathode chamber), forming a slowly growing gaseous layer.

Two techniques which are readily quantified experimentally and which avoid such accumulation are (1) a periodic brief voltage reversal at a current high enough to evolve almost momentarily sufficient anodic oxygen, thereby converting the gaseous non-permeating hydrogen to water which dissolves in the electrolyte, and/or (2) removal of the non-permeating hydrogen to the anode, for example by increasing the content of dissolved water in the molten electrolyte sufficiently to dissolve it therein and thus having it converted to water at the anode.

EXAMPLE 2

An electrochemical cell of the type described in Example 1 was used with the following modifications:

(a) The electrolyte/matrix was 1 inch in diameter (b) The second gasket had a 1 inch diameter center hole (c) The cathode/current collector was replaced with a 1 inch diameter porous nickel foam (Eltech Systems) against the electrolyte/matrix and nickel foil current collector. A 1 inch diameter 100×100 mesh nickel woven wire cloth disc was placed between the foam and foil.

The startup procedure described in Example 1 was followed except that the electrochemical cell was positioned with the electrodes horizontal and cathode on top. Measured cathodic hydrogen flows were within experimental error of the expected flows according to Faraday's Law. Hydrogen compression was verified by closing the cathode gas outlet valve an observing a constant current ($0.12$ $A/cm^2$) cathodic pressure increase to 10 psig from an atmospheric pressure anode hydrogen feed. The test was voluntarily terminated after achieving compression to 10 psig.

EXAMPLE 3

An electrochemical cell of the type described in Example 1 was fed a mixture of nominally 40% hydrogen/60% nitrogen at atmospheric pressure resulting in a sub-atmospheric partial pressure of hydrogen of about 6 psia. Approximately 120 cc/min of this gas mixture was fed to the anode compartment of the electrochemical cell operating at ca. 2 amps. Outlet flows were 106 cc/min. and 14 cc/min. from the anode and cathode compartments, respectively, resulting in about 30% of the hydrogen feed recovered as pure hydrogen and compressed to atmospheric pressure.

The inlet flow of this atmospheric pressure gas mixture was reduced to about 34 cc/min. While still operating at ca. 2 amps, the outlet flows were about 20 cc/min. and 14 cc/min. from the anode and cathode, respectively, resulting in nearly 100% of the hydrogen feed recovered as pure hydrogen and compressed to atmospheric pressure. Further hydrogen compression was verified by closing the cathode gas outlet valve and observing a pressure increase to 45 psig before the test was voluntarily terminated.

As one specific utility illustration of an appropriately scaled version of the pressurizer of Example 1, the water-wet but otherwise pure hydrogen, which is generated at ambient pressure in copious quantities in chlor-alkali plants, are compressed and upgraded on-site to dry hydrogen ready for shipment to industrial users such as microelectronics chip makers. Another illustration utilizing the scaled up version of Example 2 is merely compressing this hydrogen without drying it for use in edible oil hydrogenation. Additionally, substantial advantages are attained by in situ purification of, for example, "syn gas", a mixture containing hydrogen and carbon oxides, which is readily generated from any fossil fuel as well as from derivatives thereof including alcohols; and particularly important is the system described in our provisional application incorporated herein, in which system the low pressure anode chamber is provided with catalytic means to generate therein mixtures containing hydrogen and oxides of carbon and produce therefrom pure pressurized hydrogen in situ. When such generation comprises an endothermic e.g. steam reforming reaction, the electric heat generated by the D.C. input provides at least part of the reaction's heat requirement in situ.

Finally, it is stressed that the pressurizer of this invention is noiseless and has no moving component parts in contrast to mechanical compressors.

While only illustrative modes of purified and compressed hydrogen generation have been described, modifications which will occur to those skilled in the art are considered to fall within the scope of the invention as defined in the appended claims.

What is claimed is:

1. A generator of pure pressurized relatively high pressure hydrogen comprising a D.C. power supply, an anodic chamber containing hydrogen at a relatively low pressure, and an electrolytic pressurizing chamber; said anodic chamber being connected to the pressurizing chamber by a hydrogen-selective anode membrane bounding said anodic chamber and connected to the power supply to supply said low pressure hydrogen through said anode membrane to the pressurizing chamber electrolyte; said pressurizing chamber comprising an electrolyte of molten hydroxide or a eutectic mixture containing the same, a cathode connected to the power supply and within the electrolyte and wherein, in response to passing D.C. current between the cathode and anodic membrane, pure hydrogen arriving on the electrolyte bounding with said anodic membrane reacts substantially instantaneously with hydroxyl ions from the electrolyte to form water and electrons and evolves pure pressurized hydrogen gas on the cathode and suction-pumps the low pressure hydrogen through said anodic membrane into the pressurizing chamber; and control means to maintain a moderately elevated temperature in the pressurizing chamber between the melting point of the electrolyte and about 600° C., wherein said pressurizing chamber is bounded by the cathode which comprises a hydrogen-selective otherwise gas impermeable cathodic membrane having a face in contact with and bounding said electrolyte.

2. The generator of claim 1 wherein said low pressure hydrogen in the anodic chamber is impure.

3. The generator of claim 1 wherein said membrane comprises one of palladium and a palladium alloy.

4. The generator of claim 1 wherein said anodic chamber is provided with catalytic means for reacting therein a gaseous or gasified fuel with steam and/or a source of oxygen to provide the relatively low pressure hydrogen.

5. The generator of claim 4 wherein said cathode comprises a gas porous cathode that produces water-wet, otherwise pure, hydrogen in conjunction with said steam.

6. The generator of claim 5 wherein said porous cathode comprises one of a metallic screen, foam, felt, nonwoven fabric, and a sintered metal and wherein said pressurizing chamber is provided with steam supply means.

7. The generator of claim 6 wherein said cathode is provided with an overvoltage-reducing means.

8. The generator of claim 7 wherein said cathode is selected from the group consisting of one of high surface area palladium, platinum and nickel.

9. The generator of claim 5 wherein the generated water-wet pure hydrogen is a highly pressurized on-site product suitable for hydrogen-filling as of vehicular fuel cells.

10. The generator of claim 5 wherein the generated pure hydrogen is applied as an anode fuel as for stationary and vehicular PEM fuel cells.

11. The generator of claim 1 wherein the electrolyte is immobilized in a porous matrix.

12. The generator of claim 11 wherein said matrix is made of zirconia or alumina with a thickness between about five and fifty mils.

13. The generator of claim 1 electrically assembled in series with a similar generator and comprising a cathodic high pressure chamber connected to an anodic low pressure chamber by a pressure-resistant bipolar plate.

14. The generator of claim 1 wherein upon passing D.C. current from said power supply between the anode and the cathode, pure hydrogen arriving on the electrolyte side of the anode substantially instantaneously reacts with hydroxyl ions from the electrolyte to form water and electrons, and evolves pressurized pure hydrogen gas at the cathode.

15. The generator of claim 14 wherein the substantially instantaneous reaction at the anode creates a suction effect, which pumps pure hydrogen to permeate through said anode.

16. The generator of claim 15 wherein the pump anode and cathode and chamber walls are of materials resistant to attack by the molten electrolyte.

17. The generator of claim 1 in which the molten electrolyte fills a chamber between the anode and cathode and wherein, upon application of the D.C. power, the low pressure hydrogen in the anodic chamber is sucked into the electrolyte chamber by anodic water formation, and hydrogen reforms from water by the reverse reaction on the cathode and therethrough without extracting moisture and thereby generating dry pure hydrogen.

18. The generator of claim 1 wherein the pressurized chamber is provided with pressure protection means for preventing the pressurized hydrogen gas evolved on the cathode from permeating back into the anodic chamber.

19. The generator of claim 18 wherein said pressure protection means comprises inunobiized molten hydroxide electrolyte.

20. The generator of claim 19 wherein the electrolyte is immobilized in a porous solid alkali-resistant matrix.

21. The generator of claim 18 wherein an immobilized electrolyte layer is provided for said pressure protection.

22. The generator of claim 18 wherein the pressure protection is provided by appropriate cathode-to-anodic membrane spacing or by filling the pressurizing chamber with a non-compressible liquid electrolyte.

23. The generator of claim 18 wherein the pressurizing chamber is oriented horizontally and a hydrogen-gas-impervious continuous film of liquid is maintained over the anodic membrane.

* * * * *